US006539429B2

(12) United States Patent
Rakavy et al.

(10) Patent No.: US 6,539,429 B2
(45) Date of Patent: *Mar. 25, 2003

(54) METHOD AND APPARATUS FOR TRANSMITTING AND DISPLAYING INFORMATION BETWEEN A REMOTE NETWORK AND A LOCAL COMPUTER

(75) Inventors: Yuval Rakavy, Jerusalem (IL); Eli Barkat, Jerusalem (IL)

(73) Assignee: Backweb Technologies Ltd. (IL)

( * ) Notice: Subject to any disclaimer, the term of this patent is extended or adjusted under 35 U.S.C. 154(b) by 0 days.

This patent is subject to a terminal disclaimer.

(21) Appl. No.: 09/967,160

(22) Filed: Sep. 28, 2001

(65) Prior Publication Data

US 2002/0010775 A1 Jan. 24, 2002

Related U.S. Application Data

(63) Continuation of application No. 09/274,612, filed on Mar. 23, 1999, now Pat. No. 6,317,789, which is a continuation of application No. 08/517,666, filed on Aug. 22, 1995, now Pat. No. 5,913,040.

(51) Int. Cl.[7] ............................................. G06F 15/173
(52) U.S. Cl. ........................ 709/224; 709/225; 709/203
(58) Field of Search ................................. 709/223, 224, 709/203, 225; 714/4; 717/114; 707/203

(56) References Cited

U.S. PATENT DOCUMENTS 5,459,720 A * 10/1995 Iliev et al. ................... 370/393
5,699,275 A * 12/1997 Beasley et al. .............. 709/221
6,113,652 A * 9/2000 Lysik et al. .................. 709/223
6,314,103 B1 * 11/2001 Medhat et al. ............ 370/395.2

FOREIGN PATENT DOCUMENTS

| JP | 1-248640 A1 | 4/1985 | ........... H04L/11/20 |
| JP | 62-69758 A1 | 9/1985 | ........... H04M/3/00 |
| JP | 1-279653 A1 | 5/1988 | ........... H04L/11/12 |
| JP | 5-143653 A1 | 11/1991 | ........... G06F/15/40 |
| JP | 6-243173 A1 | 2/1993 | ........... G06F/15/40 |

* cited by examiner

Primary Examiner—Mehmet B. Geckil
(74) Attorney, Agent, or Firm—Skadden, Arps, Slate, Meagher & Flom LLP

(57) ABSTRACT

Methods and apparatus are provided for selecting advertisements and other information from a computer network database based on user defined preferences and transmitting the selected advertisement in background mode over a communications link between the computer network and a local computer with minimal interference with other processes communicating over the communications link. This method includes monitoring the communications link and transmitting portions of the advertisement when the communications link line utilization is below a preestablished threshold. Methods and apparatus are also provided for displaying or otherwise presenting the selected advertisements on the user's computer. Additional methods and apparatus are provided for selecting and presenting information stored on a local storage media based on user defined preferences.

6 Claims, 8 Drawing Sheets

METHOD AND APPARATUS FOR TRANSMITTING AND DISPLAYING INFORMATION BETWEEN A REMOTE NETWORK AND A LOCAL COMPUTER

CROSS REFERENCE TO RELATED APPLICATIONS

This application is a continuation of U.S. application Ser. No. 09/274,612, filed on Mar. 23, 1999, now U.S. Pat. No. 6,317,789; which is a continuation of U.S. application Ser. No. 08/517,666, filed on Aug. 22, 1995, now U.S. Pat. No. 5,913,040.

FIELD OF THE INVENTION

This invention relates generally to advertisement computer display systems and more particularly to a method and system for displaying advertisements and other information on a computer based on general user selected criteria and transmitting such information from a remote network to the local computer.

BACKGROUND OF THE PRESENT INVENTION

There are two major forms of advertising which are currently being employed on the Internet and commercial on-line services. One form is the use of a small advertisement on WEB pages which are commonly accessed. For example, a portion of the screen display for WEB pages used to access Internet searches may include a corporate logo or other advertisement material. Typical of this style of advertising is the Netscape™ Internet Browser software available from Netscape Communications Corporation of Mountain View Calif., which presents a box containing logos for various corporations on the computer display when the user performs a search. This form of advertising, however, is not very sophisticated and does not encourage user interaction.

Another form of advertising on the Internet is the creation of WEB "pages" or sites by advertisers. One variant of the use of a WEB page displays advertisements in a portion of the viewing area. A second variant, often used by corporate or other advertisers, is the use of WEB sites which employ attractive graphics in the hope of having the user interact with various advertising schemes. In addition, product ordering is usually available from these WEB sites. In most cases, users access these WEB sites by one of the following methods: knowing the Internet address; keyword searching; linking from a different WEB site; through an electronic shopping mall type site; through other advertisements on the Internet; or through the use of programs known as search browsers.

Current advertisers have attempted to improve the attractiveness of these WEB pages by including the use of sound, animated or rotating logos or pictures, and scrolling information. One system, Hot Java, available from Starwave Corp of Bellevue, Wash., supports the execution of small applications programs written in a specific programming language executing within the browser on the local computer. This allows the WEB pages to provide richer content, such as animation or scrolling sports scores across a user's computer display, and better interaction with users. These effects, however, are only available while the user is viewing the specific WEB page incorporating the Hot Java technology.

Despite the fast and furious growth in this advertising sector, WEB sites are still regarded as "passive" advertising used predominantly for a corporate image rather than for selling products. Specifically the following drawbacks describe the current state of advertising on the Internet: transmitting the advertising information consumes a large amount of the bandwidth of the communications link between the user's computer and the network; access is initiated by the user rather than the advertiser; the user rather than the advertiser pays for access; accessing a site is a time consuming "hit or miss" process; and the process may improve the corporate image but creates little product demand.

U.S. Pat. No. 5,105,184 to Pirani et al. ("Pirani") discloses a system integrating commercial advertisements with computer software. The system discloses integrating commercial advertisements with different types of screens. Pirani, however, does not provide for any user input at the local computer as to the types of advertisements which are to be displayed. Thus, users would be forced to view numerous advertisements of which they are likely to have no interest. This will attenuate the users attention to the advertisements and decrease their effectiveness.

As noted above, a significant problem with current methods for advertising on computer networks is the consumption of significant portions of the bandwidth of the communications link between the user's computer and the computer network. Prior systems have attempted to utilize essentially unused time in telephone networks to deliver advertising or other information. U.S. Pat. No. 5,321,740 to Gregorek, et al. ("Gregorek") discloses a marketing system over an existing telephone network which modifies a portion of the call processing system to play an informational announcement in place of the usual ringback or busy signals. Gregorek differs from the present invention in a number of ways, including the fact that it does not provide any means for interacting with computers over a computer network. Also, Gregorek delivers the informational announcement only during a short splice of time when the user is waiting for callback information.

Current file transfer protocols, such as the File Transfer Protocol ("FTP") and the Trivial File Transfer Protocol ("TFTP"), for transferring files from a remote network, such as the Internet, via a communications link to a local computer are designed to transfer files as quickly as possible. Each computer process executing such a protocol attempts to make maximum use of the available communication resources. This leads to interference and an inevitable slowing down of other computer processes attempting to communicate over the communications link. There exists a need, therefore, for a file transfer process which is designed to behave as a background task and have a minimal impact on foreground communications.

There also exists a need to utilize the computer to display locally stored advertisements. Several software products provide "yellow pages" on CD-ROMs or other media such as floppy disks. The user may use these yellow pages to search for products or advertisers by name or description. This system of advertising is limited, however, in that it requires the user to actively search for advertisers or products and therefore do not spontaneously display products to the user.

Microsoft Windows interface provides a rudimentary form of spontaneous advertising by incorporating a Microsoft Windows logo as an option in its screen saver utility. This system, however, offers only a single advertisement in response to a user's response and therefore does not offer a variety of periodically changed advertisement content based on a user's interests.

SUMMARY OF THE INVENTION

The object of the present invention is to provide a process for transmitting an information file between a local computer and a remote computer network over a communications link with minimal interference to other processes executing on the computer which are also transmitting over the communications link.

It is a further object of the present invention to provide a method and system of presenting individualized advertisements and other informational messages on a computer by allowing a user to select from a variety of advertisement or informational categories.

It is a further object of the present invention to provide a method and system of downloading and presenting individualized advertisements and other informational messages from a network to a local computer from a remote network to a local computer based on a user's selection of advertisement or informational categories.

It is a further object of the present invention to provide such a method and system of downloading and presenting individualized advertisements and other informational messages from a network to a local computer with minimal interference with other data being transmitted between the network and the local computer.

In one variant of the present invention, all advertisements or other informational messages originate on a network server which is accessed via the Internet or alternate on-line method. Select advertisements are transparently downloaded from the network server and stored locally on the user's local computer using a novel type of software referred to herein as a "Polite Agent." In a second variation, the entire advertisement database is locally stored on the local computer or a removable media such as CD-ROM. Manipulation and display of the advertising message is performed by software residing on the user's PC in accordance with preconfigured user preference information.

The advertisement is preferably displayed during idle time as a screen saver utility when the computer is not receiving keyboard input or updating the user's display. Other techniques for displaying the advertisement, such as periodic audio-only messages, screen background wallpaper, cursor modifications, and display in a window on the user's computer display are also available.

Users may enter their preferences by directly choosing categories of advertising or other informational content which most interest them or through interactive games and quizzes. Users may directly respond to advertising messages by participating in contests, requesting further product information, or ordering the advertised product. The advertisements are made attractive to the user by employing a variety of video, animation, sound or any other multimedia effects. Content may be based on an interactive theme such as a contest or special discount offers for on-line customers.

The system monitors the user's interaction with the advertisements and produces raw data on how many times a particular advertisement was accessed as well as the user's response to advertisements. All pertinent information is stored and sent back to a network server where it is made available to the advertisers. User requests for additional information may be directed to the advertiser itself or to the advertiser's WEB site on the network.

The system further comprises the use of a background software process, the Polite Agent, for transferring information between the network and the local computer. The Polite Agent monitors the communications link between the network and the local computer and transfers small portions of the information when the communications link utilization rate is low. In this manner the Polite Agent avoids significant interference with other communications applications transmitting over the communications link. The Polite Agent may also be utilized to transmit other types of information content, such as news, weather, stock quotes, sports scores, software updates or trip reservation information.

BRIEF DESCRIPTION OF THE DRAWINGS

For a more complete understanding of the present invention, reference is made to the following Detailed Description taken in conjunction with the accompanying drawings in which.

DETAILED DESCRIPTION

Preferred embodiments of the present invention will now be described with continued reference to the drawings.

System Architecture
1. Network Architecture

Figure 1:
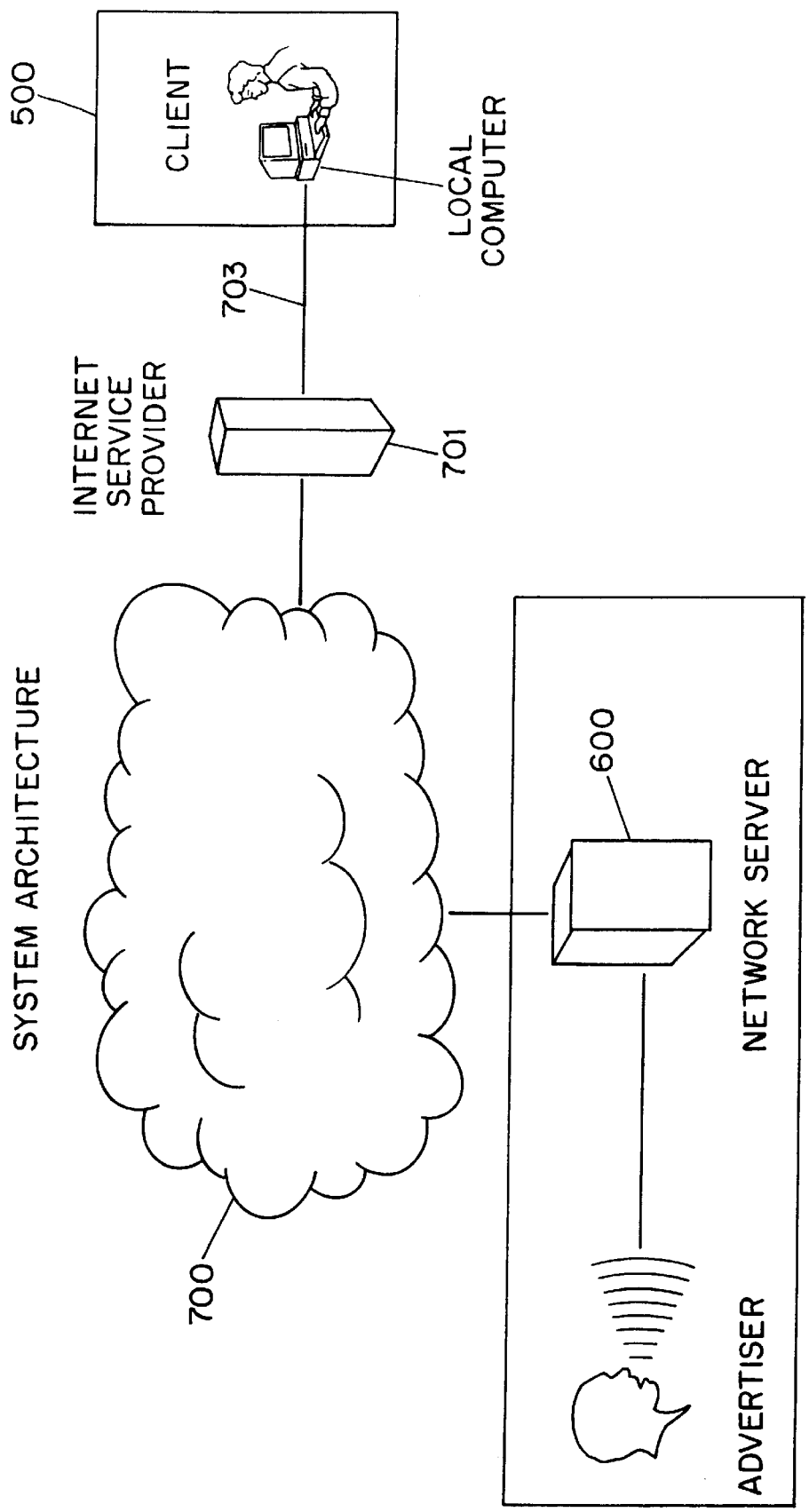
FIG. 1 is a functional block diagram of a system architecture in accordance with the present invention.
Figure 2:
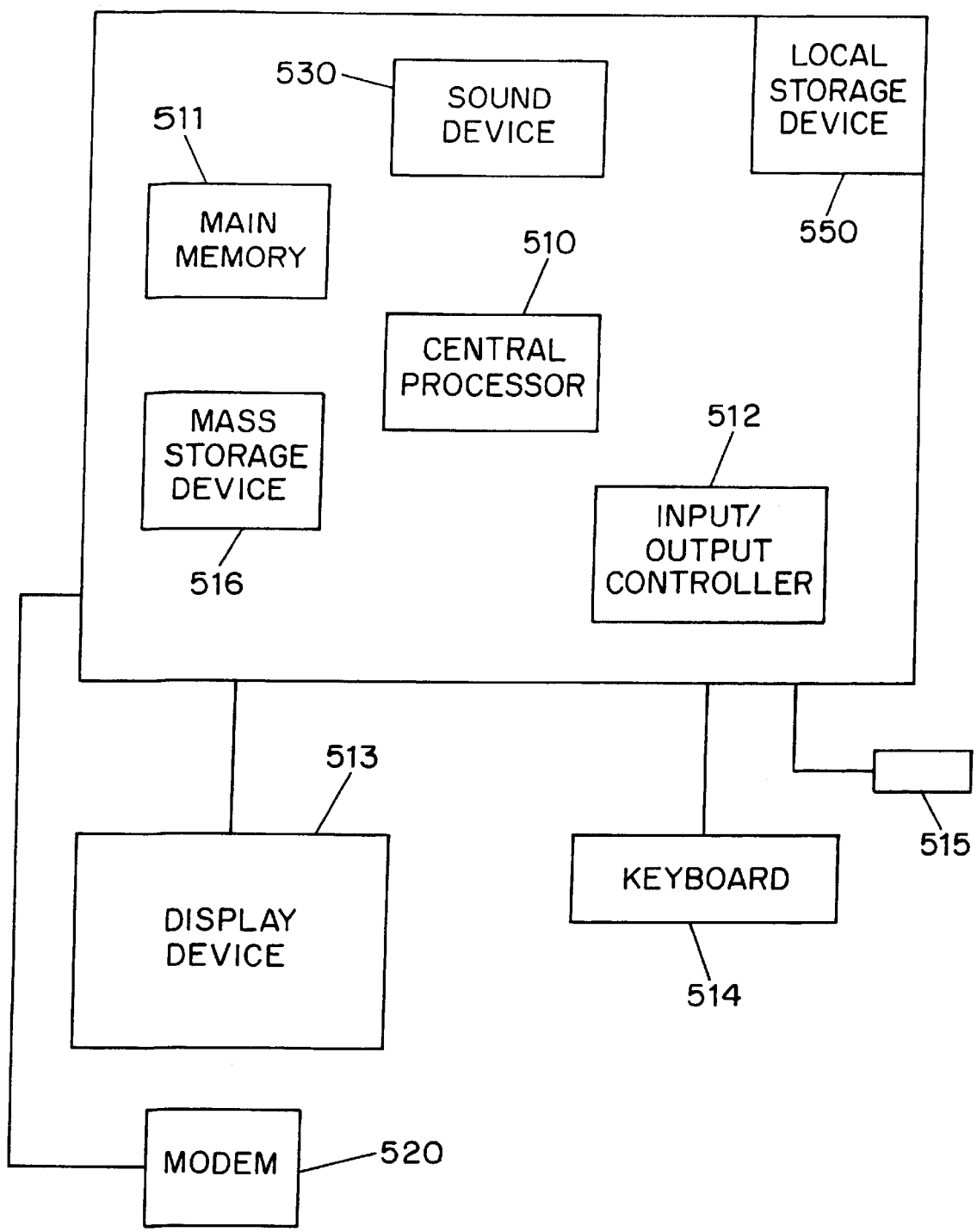
FIG. 2 is a functional block diagram of a local computer and its related components in accordance with the present invention.

FIG. 1 shows an overall view of a preferred embodiment of the system architecture. The Local Computer 500 is physically connected to the Network Service Provider 701 via a Communications Link 703. The Network Service Provider 701 provides access to the Network 700. Advertising System Server 600 is one of the nodes on the Network 700.

a. Local Computer:

As shown in FIG. 2, the Local Computer 500 preferably includes a Central Processor 510, a Main Memory 511, an Input/Output Controller 512, a Display Device 513, input devices such as a Keyboard 514 and a Pointing Device 515 (e.g., mouse, track ball, pen, slide pointer or similar device), and a Mass Storage Device 516. These components communicate through a system bus or similar architecture.

Additionally, the Local Computer 500 is preferably connected to an internal or external Modem 520 or like device for communication with the Network 700. Alteratively, the Local Computer 500 may be connected via an ISDN adapter and an ISDN line for communications with the Network 700. The Modem 520 optionally allows for the establishment of voice calls through software control.

The Local Computer 500 preferably also includes a Sound Device 530. The Local Computer 500 may also include a Local Storage Device 540 such as a floppy disk, CD-ROM or like device for local storage of the Local Advertisement Database 550.

The Local Computer 500 is preferably under the control of a multi-process operating system including a TCP/IP interface, and most preferably operated under the Microsoft® Windows-95 platform available from Microsoft Corporation of Redmond, Wash. However, the present invention may be embodied on a variety of different platforms, including Macintosh, UNIX, NextStep, MS-DOS, and the like.

b. Network

The Network 700 is preferably the World-Wide Internet. The World-Wide Internet ("Internet") is a world-wide network connecting thousands of computer networks. The dominant protocol used for transmitting information between computers on the Internet is the TCP/IP Network Protocol. Computers connect to the Internet use either a fixed connection, in which case they become a "permanent" node on the Internet, or a dial-up connection, in which case then act as a node on the network as long as the connection is active. Internet addresses are the numbering system used in TCP/IP communications to specify a particular network or computer on the network with which to communicate.

The invention may also be practiced with commercial on-line services such as America Online, available from America Online Inc., CompuServe, available from H&R Block Inc., Prodigy, available from Prodigy Services, Microsoft Network, available from Microsoft Corp., as well as other like services from a variety of companies such as AT&T Corporation and MCI Communications Corp.

c. Network Service Provider

The Network Service Provider 701 provides access to the Network 700. Commercial providers include: BBN, Netcom, and Prarienet.

d. Advertising System Server

The system preferably includes at least one Advertising System Server 600. The main roles of the Advertising System Server 600 are to store Advertisements 50, transfer the Advertisements 50 to the Local Computer 500, and collect user feedback. The Local Computer 500 will initiate communication with the Advertising System Server 600. Each user is assigned a unique user-ID which can not be changed by the user. This user-ID is used by the Advertising System Server 600 to track each user's activity, including which Advertisements 50 have been downloaded to the user.

When the Local Computer 500 connects to the Advertising System Server 600, the Local Computer 500 will upload the user's user-ID and the configuration and user preference information to the Advertising System Server 600. The Advertising System Server 600 uses this information to select the next Advertisement 50 to be downloaded. The Local Computer 500 also may directly request a specific advertisement through the use of a unique Advertisement-ID 55 assigned to each Advertisement 50. If feedback information has been collected it also will be uploaded when the Local Computer 500 connects to the Advertising System Service.

In an alternate embodiment of the present invention, the selected advertisement may be stored on any one of the plurality of advertising system servers connected to the Network 700. In this embodiment, the Local Computer 500 initiates communication with a predetermined advertising system server. The predetermined advertising system server will select the next Advertisement 50 to be downloaded and transmit the network address of the advertising system server storing the Advertisement 50. The Local Computer 500 uses the transmitted network address to request the selected Advertisement 50 from the appropriate advertising system server.

The Advertisements 50 stored on the Advertising System Server 600 may be translatable to one or more natural languages. The Advertising System Server 600 will use each user's native language-ID to transmit the appropriate natural language version of the Advertisement 50.

2. Advertising System Server Software Architecture a. Software Modules

Figure 3:
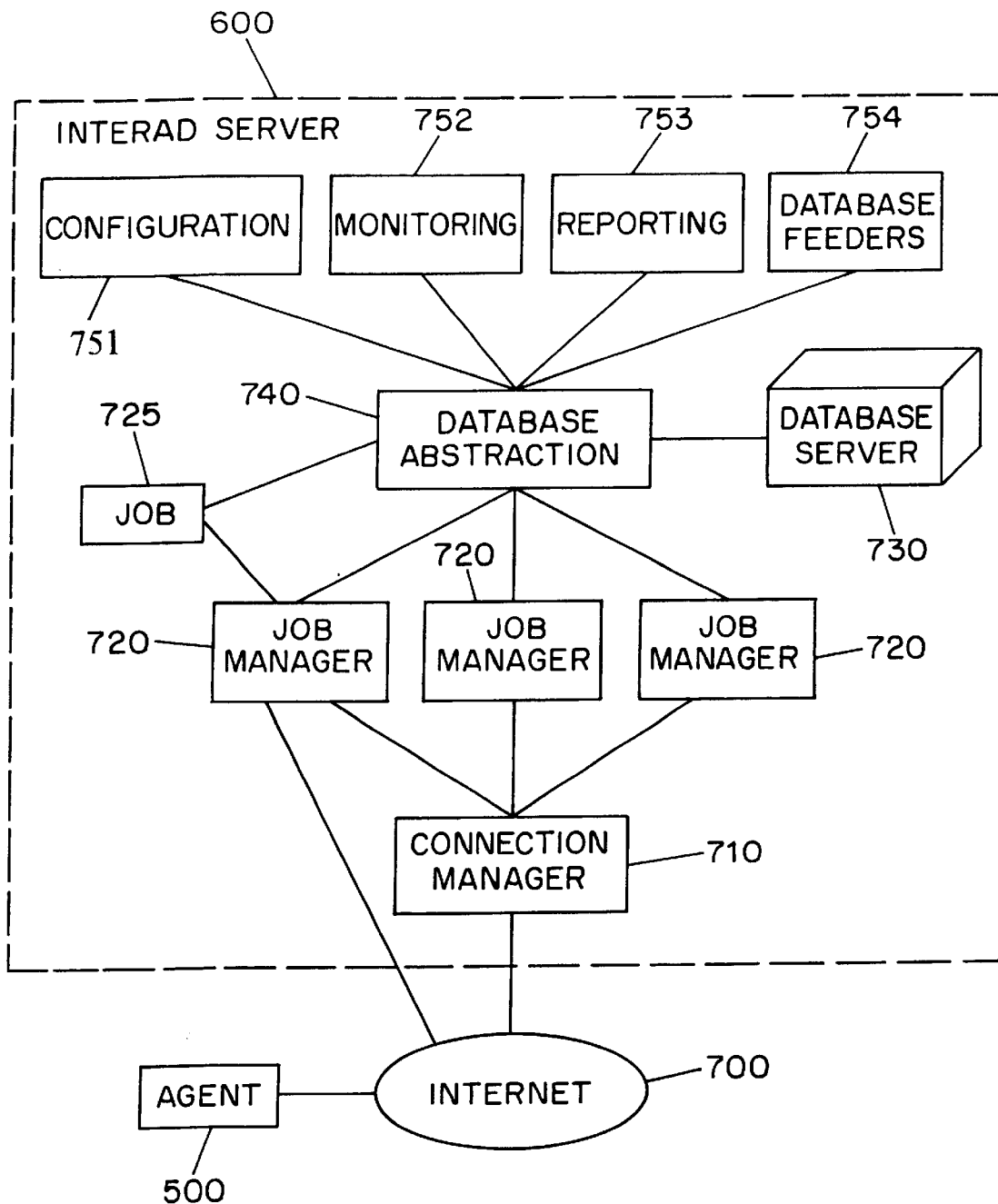
FIG. 3 is a functional block diagram of the software architecture components of the advertising system network server in accordance with the present invention.

FIG. 3 is a functional block diagram of a software architecture of the Advertising System Server 600 embodying the invention.

The Local Computer 500 initially connects to the Connection Manager 710 which is responsible for allocating an available Job Manager 720 and returning its address to the agent. The Job Manager 720 then handles all further conversation with the Local Computer 500. As noted above, the architecture optionally allows for a plurality of advertising system servers each running a plurality of Job Managers 720. Thus, the Job Manager address returned to the Local Computer 500 may contain both the Internet address of the server and the process identification. The Job Manager 720 identifies and authenticates the user-ID against the Server Database 730.

The Job Manager 720 creates a Network Job 725 for each user it communicates with. Each Network Job 725 communicates with the Local Computer 500 to select and download Advertisements 50; collect feedback from the Local Computer 500; check the user's participation and any awards from contests, etc.; and upgrades and installs the Local Computer 500 software versions. The Network Job 725 is responsible for selecting the next downloaded Advertisement 50 based on user configuration and preference data as described herein.

Under most current network models, including the current implementation of the Internet, users are typically charged based on the amount of time they are connected to specific resources on the network. Thus, the current system of downloading advertisements and other information in the background does not increase the cost to the user, as transmission occurs in background mode while the user is already connected to the network Service Provider 701. Future implementations of these networks, however, may charge users based on the amount of information, or number of network "packets" or other units of data, the user has received. On such networks, the system should be able to track the amount of information transmitted, such as by counting the number advertisements, advertisement resources, or network packets (also known as "datagrams"), frames, segments or other units of network data containing advertisements. The Network Service Provider 701 may use this information to charge the system generated transmissions to the advertisers rather than the users. The Advertisement System Server 600, and most preferably the Network Job 725, will be responsible for tracking the amount of information transmitted by the system. Alternatively, the TCP/IP Polite Agent 280 or other software process on the Local Computer 500 will track this information.

The Server Database 730 contains the system information, including: the Advertisements 50 or other informational content; listings of users; listings of advertisers; listings of network service providers; billing information; audit logs and statistics. The Server Database 730 also maintains information on active connections and their activity. The Server Database 730 is accessed through the Database Abstraction 740 interface which provides a layer of interface for all modules on the Advertising System Server 700.

In addition to providing Advertisements 50 and other informational content to local computers, the Advertising System Server 600 also provides various management services, such as billing information, viewing and gathering statistics on feedback information, and advertisement display audit-logs which may be sorted according to various filters such as advertiser or advertising category. The Advertising System Server 700 includes various other software administration tools for maintaining the system, including: a Database Feeder 754 for modifying the Server Database 730; Monitoring Tools 752 for viewing the activity of the system; Configuration Tools 751 for modifying the behavior of the system; and Reporting Tools 753 for creating reports concerning the system.

b. Advertisement Records

Figure 5:
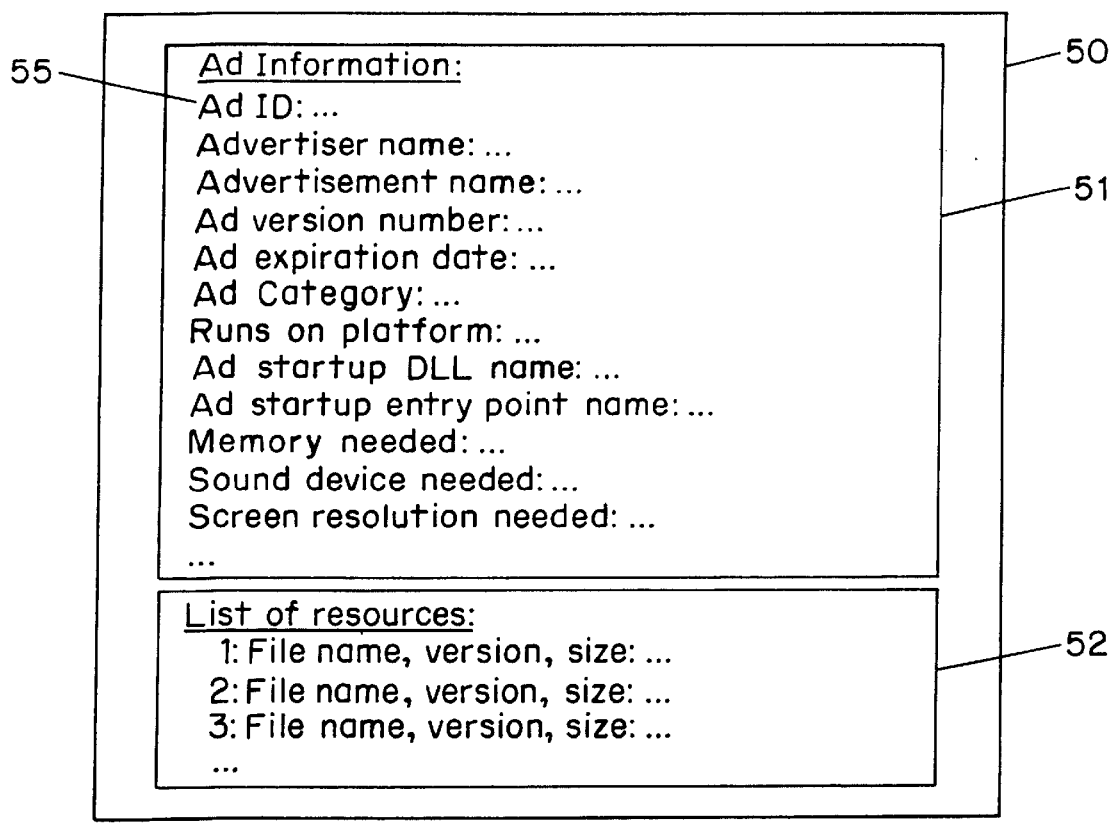

FIG. 5 shows a schematic representation of an Advertisement 50. Each Advertisement 50 in the Server Database 730 comprises an Advertisement Information Record 51 and a Resource List 52. The Advertisement Information Record 51 contains information identifying the advertisement (including the Advertisement-ID 55), its category, its size, and the hardware required to display the advertisement, such as sound boards, screen resolution and multimedia requirements. The Resource List 52 contains a list of resources (bitmaps, animations, digitized audio segments, executable code, etc.) that must exist on the Local Computer 500 or associated local LAN in order to present the advertisement. The Resource List 52 includes a unique resource-ID, a resource type, and a resource pointer. The resource pointer identifies a file, a database record, a block of data, or other means of identifying the resource. In this manner, resources can be shared by various Advertisements 50.

3. Local Computer Software Modules a. Software Architecture

Figure 4:
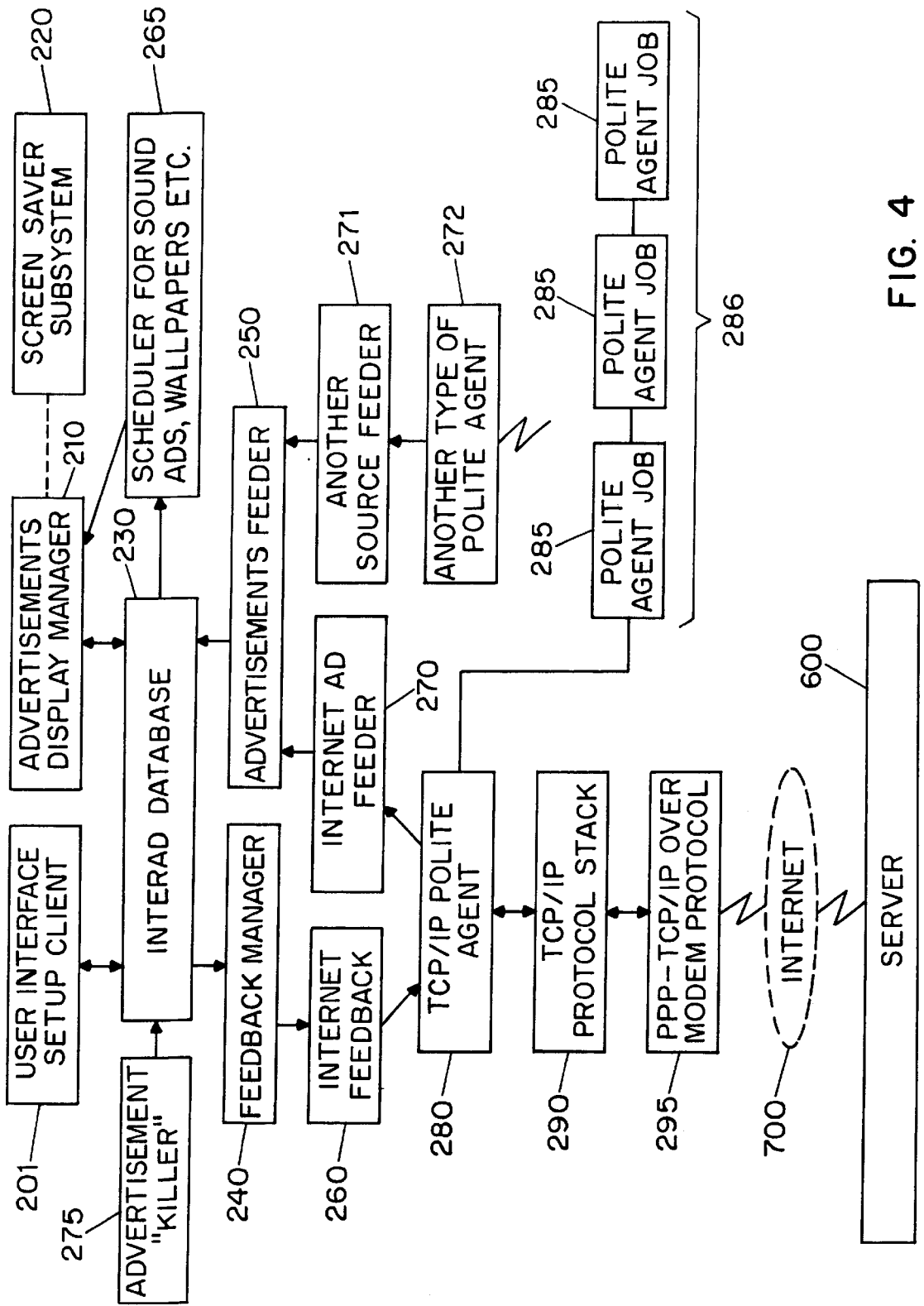
FIG. 4 is a functional block diagram of the software architecture components of the local computer in accordance with the present invention FIG. 5 a schematic representation of an advertisement file in accordance with the present invention.

FIG. 4 is a functional block diagram of the software modules and processes of the software architecture for a preferred embodiment of the invention on the Local Computer 500, including a User Interface Setup Process 201, Advertisements Display Manager 210, Screen Saver Subsystem 220, User Preference and Advertisements Database 230, Feedback Manager 240, Advertisements Feeder 250, Internet Feedback 260, Advertisement Killer 275, Scheduler 265, Internet Feeder 270, TCP/IP Polite Agent 280, TCP/IP Protocol Stack 290, and PPP-TCP/IP Over Modem Protocol 295.

The User Interface Setup Process 201 allows the user to configure the behavior of the system on their desktops. The Advertising Display Manager 210 is responsible for selecting and displaying Advertisements 50 from the User Preference and Advertisements Database 230. The Advertisements Feeder 250 adds new Advertisements 50 to the User Preference and Advertisements Database 230, while the Advertisement Killer 275 purges old Advertisements 50. The Scheduler 265 schedules the display of time dependent Advertisements 50, such as background wallpaper, sound only advertisements, and cursor advertisements. The Feedback Manager 240 sends user preferences, user statistics and feedback information to the Advertising System Server 600. The TCP/IP Protocol Stack 290 and PPP-TCP/IP Over Modem Protocol Subsystem 295 handle the lower level details of transferring information to the Network 700. The TCP/IP Polite Agent 280 is responsible for monitoring the communications line utilization rate and transmitting data during times of low communications line utilization.

b. Platform Implemented Functions

The Screen Saver Subsystem 220 tracks user interaction with the system. When the Screen Saver Subsystem 220 detects that the system has been idle, for example, when there has been no user interaction with the computer (through the use of the keyboard, mouse, pointing device or other user input device), for a preconfigured time, it activates the Advertisements Display Manager 210 which will select an advertisement and display it.

In prior systems, screen savers are graphically oriented displays which appear after the computer has been idle for a predetermined period of time. This change of display is primarily designed to prevent screen 'bum in' on the monitor. Screen savers of the prior art are limited to one or more predefined content themes. By utilizing on-line communications, the screen saver of the present invention provides a wide variety of potential content themes which may be personalized and modified on a timely basis in accordance with user preferences.

The general mechanisms for implementing the Screen Saver Subsystem 220 are known in the art. In the preferred embodiment, the Windows-95 operating system monitors user input and calls a preconfigured module when the user has not entered input for a predetermined period. In the preferred embodiment, this module is the Advertisements Display Manager 210. The Screen Saver Subsystem 220 is further described in Microsoft's *Windows-95 Software Development Kit*, including: WIN 32 Overview and reference manuals (chapter 79—Screen Saver Library), available from Microsoft Corp., which is hereby incorporated by reference. On other platforms which do not provide similar functionality, the Advertisements Display Manager 210 itself must monitor for idle time.

The general mechanisms and protocols for communicating with a network, such as the Internet, or on-line service, are known in the art. See, e.g., Stallings, W., *Data and Computer Communications*, Second Edition, Macmillan Publishing Co., (1988). The preferred embodiment utilizes the TCP/IP protocol (Transport Control Protocol/Internet Protocol) which is also well known in the art. See, e.g., Martin J., *TCP/IP Networking*, PTR Prentice Hall (1994). The disclosure of each of the foregoing is hereby incorporated by reference. Methods of implementing these functions on other platforms are known to those of ordinary skill in the art.

The TCP/IP Protocol Stack 290 is a set of programs that mediate between application programs and the physical communication line. The TCP/IP Protocol Stack 290 provides application programs with a standard set of function calls for communicating with other application programs connected to the Network 700. Thus the application programs, here the TCP/IP Polite Agent 280, do not have to account for the nature of the physical communication line or error correction.

The PPP-TCP/IP Over Modem Protocol 295 module provides the ability to use the TCP/IP protocol over a specific type of physical communication line, i.e. a pair of modems connected over a telephone line. In the preferred embodiment, the functions of the TCP/IP Protocol Stack 290 and PPP-TCP/IP Over Modem Protocol 295 are implemented within the Windows-95 platform and are accessed from the TCP/IP Polite Agent 280 via system calls. See Microsoft Windows Socket Specifications (rev. 1.1), the disclosure of which is hereby incorporated by reference. Methods of implementing these functions on other platforms are known to those of ordinary skill in the art.

c. User Preference and Advertisement Database

The User Preference and Advertisement Database 230 contains various information needed by the system. The primary data stored is the advertisement information (including executable code modules, bitmaps, video clips and sound clips). The database also stores display statistics, configuration information and user preference data.

Typically, the User Preference and Advertisement Database 230 is located on the Mass Storage Device 516, however, in LAN installations, the User Preference and Advertisement Database 230 may be stored on a LAN server. This optimizes storage for the system, since an Advertisement 50 needs to be loaded on the LAN only once and is available for display by each workstation on the LAN.

The User Preference and Advertisement Database 230 is preferably accessed through a well-defined Application Programmer's Interface (API), as is known in the art. In the preferred embodiment, this may be an OLE2 compound file or other database means supplied by third-party software vendors. Thus, the location of the User Preference and Advertisement Database 230 will be transparent to the other processes.

d. User Interface Setup

The User Interface Setup Process 201 allows the user to configure the behavior of the system. This process allows the user to input and view preferences as to advertising categories, as well as local computer configuration data.

Local configuration data typically includes:

a) The Advertising System Server 600 Internet name or Internet address.

b) The amount of disk space on the Local Computer 200 or LAN which may be allocated to the advertising system.

c) The length of time an advertisement should be stored before it is deleted from the Local Computer 200.

d) The overhead which may be caused by the advertisement transfer process, including the communications line threshold.

e) Screen saver delay time.

f) Whether feedback information may be sent to the Network 700. User preference information typically includes:

a) Listings of advertisement categories which are to be given high priority, and those categories which are to be banned from being downloaded or displayed. Typical advertisement categories are "SCUBA diving equipment," "Fast food vendors," "Toys for ages 8–14," or "Cigarettes" and the like. The actual list of categories will be provided by the Advertising System Server 600.

b) Time periods during which sound-only advertisement are to be played.

c) Whether wallpaper or cursor advertisements are allowed.

d) Whether animation is allowed.

e) Time periods and types of foreground activities during which advertisements and feedback information may be transmitted.

f) Identification of the user's natural language.

Additionally the User Preference and Advertisement Database 230 stores information on the Local Computer's 200 platform capabilities, such as sound boards, server resolution and multi-media capabilities.

The Advertisement Feeder 250 will incorporate the advertising preference information, the Local Computer's platform capabilities, disk space limitations, and other configuration data into its request for new advertisements. The Advertising System Server 600 uses this information in selecting the next advertisement to be transmitted. The user preference and configuration data may alternatively be stored on the Advertising System Server 600.

The Job Manager 720 on the Network Server 600 matches the user preferences and configuration data against the category information for the available Advertisements 50. Advertisements 50 matching the user's high priority categories and platform capabilities are selected for downloading. Lower priority matches are also selected occasionally on a pseudo-random basis, such that Advertisements 50 within the user's high priority categories will have higher probabilities of being downloaded. The system also allows for increasing the probability of downloading particular advertisements 50. This allows advertisers to pay increased rates to distribute advertisements faster and to a wider range of users.

User's preferably enter their preferences using whatever interfaces are most natural for the underlying platform. In the preferred embodiment, the user enters information through standard Windows-92 dialog boxes.

In one embodiment of the invention, the Advertising Display Manager 210 allows users to respond to Advertisements 50 being presented by selecting a user grading box which allows users to judge the Advertisements 50 on a scale from "do not show me this advertisement again" to "excellent." This information may be used to modify the user preferences, and may also be incorporated into user feedback information and sent to the Advertising System Server 600 for use by the advertisers.

The User Interface Setup Process 201 also allows users to browse through Advertisements 50 stored on their local system (hard disk or local LAN network), as well as those Advertisements 50 available from the Network 700. For Advertisements 50 stored locally, whether downloaded from the Network 700 to the User Preference and Advertisement Database 230 or available on a Local Advertisement Database 550 stored on floppy disk, CD-ROM or like device, the User Interface Setup Process 201 displays a menu with the available Advertisements 50. Each Advertisement 50 stored on the Network 700 or Local Advertisement Database 550 may optionally include a preview segment. The user may have the system present the preview of the Advertisement 50 such as a still image, a short animation sequence, or a sound clip. The user may then select the particular advertisement to be displayed. For Advertisements stored on the Network 700, the Advertising System Server 600 will transmit a list of available Advertisements 50. Users may also disable specific advertisements, or all advertisements of a specific advertiser from being transmitted to the Local Computer 500 or displayed.

e. Advertisement Display Manager

The Advertisement Display Manager 210 selects and displays Advertisements 50 from the User Preference and Advertisements Database 230. The Advertisement Display Manager 210 is typically activated by the Screen Saver Subsystem 220 when the user has not entered input for a predetermined time, or from the Scheduler 265.

Alternatively, the user may directly access the Advertisement Display Manager 210 from the platform, such as through selecting an icon or other common method.

Figure 8:
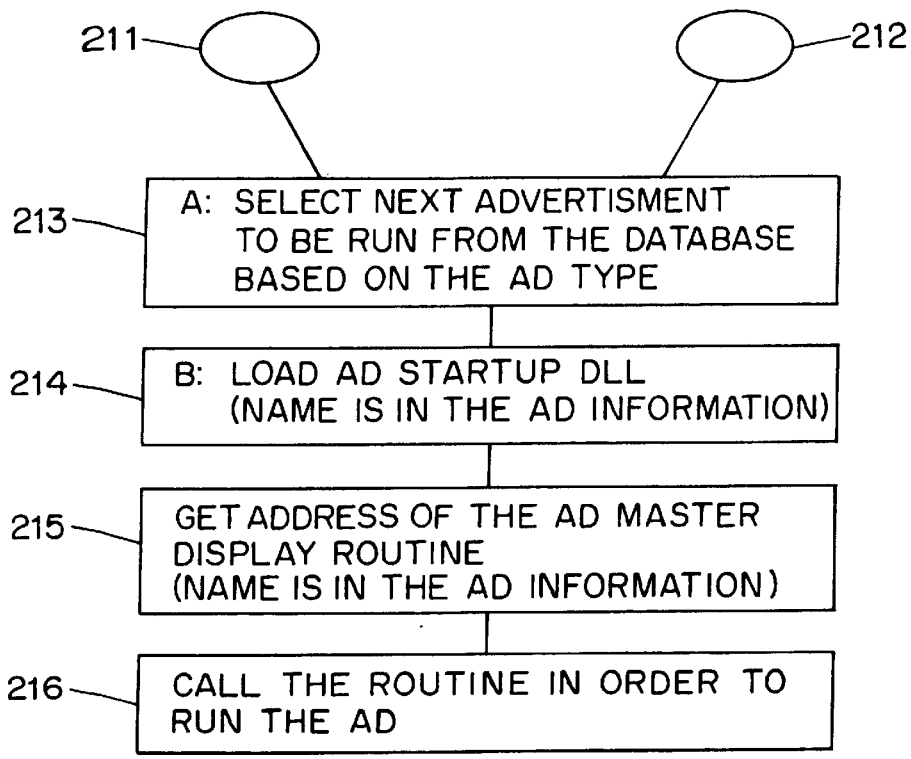
FIG. 8 is a flowchart illustrating a method for an advertisement display manager constructed in accordance with the present invention.

The Advertisement Display Manager 210 will display the collection of bitmaps, animation, and sound clips associated with the Advertisement 50. FIG. 8 shows a flowchart of a preferred method of an Advertisement Display Manager 210 in accordance with the principles of the present invention. The Advertisement Display Manager 210 is typically called by either the Screen Saver Subsystem 220 to display a screen saver type advertisement after the system has been idle for a predefined period or by the Scheduler 265 to modify the background wallpaper or present a sound-only type advertisement on a periodic basis. The Advertisement Display Manager 210 selects and presents the next Advertisement 50 of the specified type to be presented from the User Preference and Advertisements Database 230.

In the preferred embodiment, the display and other presentation capabilities for each advertisement are self-contained within the Advertisement 50 itself. In this manner the Advertisement Display Manager 210 can support a virtually unlimited number of presentation techniques. The code needed for presenting the advertisement such as a digital sound or video decoder or animation file player, is a resource available from the Resource List 52 within the Advertisement structure 50. The resource may exist in a number of forms such as executable or interpreted code or scripting code such as that used in Hot Java, available from Starwave Corp. When the resource consists of interpreted or scripted code, the interpreter itself becomes an additional resource which must be made available to the Local Computer. If necessary, the Advertisement Feeder 250 will download this resource to the Local Computer 500, using the same techniques as used to download other advertisement data.

Many platforms, including the preferred Windows-95 platform, include a multi-media subsystem that provides APIs for playing animation, sound clips, video clips, etc. See Win32 Programmer's Reference Manual, hereby incorporated by reference. Alternatively, there are a wide variety of stand-alone tools suitable for providing such functions on Windows, Macintosh and other platforms.

In the preferred embodiment, each Advertisement 50 will include a small DLL with an entry point with a pre-defined name. This entry point will be called by the Advertisement Display Manager 210 in order to display the Advertisement 50. The advertisement entry point is specific for each Advertisement 50. When the advertisement entry point is called, the particular code needed to present the given Advertisement 50 will be executed.

User interaction with the Advertisement Display Manager 210 is preferably initiated by pressing a predesignated key, for example F10. When the Advertisement Display Manager 210 is active, all user input is routed directly to the Advertisement Display Manager 210, thus allowing for user interaction with Advertisements 50. The Advertisement Display Manager 210 selectively forwards certain keys to the default operating system routine, which will typically terminate the Advertisement Display Manager 210. The user may interact with the Advertisement Display Manager 210 through a number of ways, including answering questioners, initiating a WEB browser to connect directly to an advertiser WEB page on the Network 700, or automatically initiating a voice connection through the Modem 520 to the advertiser.

Additional aspects of the present invention utilize a variety of techniques for presenting the Advertisements 50. These techniques include displaying advertising as the background "wallpaper" of the display or modifying the cursor to include an advertiser's logo or other symbol. Additionally, small advertising logos or other advertising content may be placed on the Display Device 513 either at a fixed location on the Display Device 513 or fixed relative to user display windows such that when the user display window is moved on the display the advertisement will move with the window. In the preferred Windows-95 environment, these functions are performed through system calls as described in the Win32 Programmer's Reference Manual, available from Microsoft.

An additional presentation technique is the use of sound-only advertising. The Advertisement Display Manager 210 will make use of a Sound Device 530 on the Local Computer 200. Any sound devices supported by the platform are suitable. In the preferred embodiment, this includes the Sound Blaster card, available from Creative Labs.

f. Scheduler

The Scheduler 265 keeps track of the list of timing-dependent operations. When the time comes to execute a timing-dependent Advertisement 50, as for example changing the wallpaper or playing a sound-only Advertisement 50, the Scheduler 265 notifies the Advertising Display Manager 210, which performs the required action.

g. Advertisements Feeder

The Advertisement Feeder 250, is responsible for adding new Advertisements 50 to the User Preference and Advertisement Database 230. Advertisements 50 preferably are provided from the Internet through the Internet Feeder 270, however, the Advertisements Feeder 250 is not dependent on the type of advertisement source and may receive Advertisements 50 from other sources, such as commercial on-line services, via other feeder mechanisms and other types of polite agents, as shown by references 271 and 272, respectively, in FIG. 4.

Figure 9:
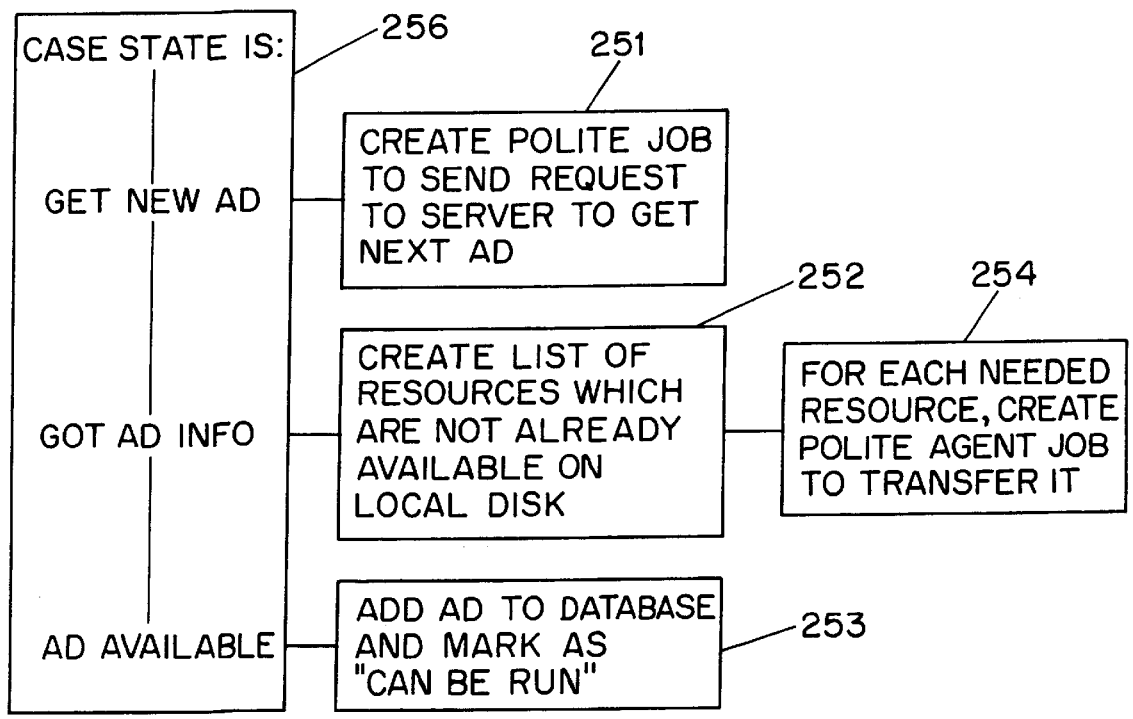
FIG. 9 is a flowchart illustrating a method for an advertisement feeder for downloading advertisements from a network constructed in accordance with the present invention.

FIG. 9 shows a flow chart of a preferred embodiment of an Advertisement Feeder 250 constructed in accordance with the invention.

To download a new Advertisement 50, the Advertisement Feeder 250 first creates a Polite Agent Job 285 to request the Advertising System Server 600 to select the next advertisement for downloading (step 251). The Advertising System Server 600 selects the next Advertisement 50 to be transferred based on the individual user's preferences and configuration and pricing parameters attached to each Advertisement 50. The Advertising System Server 600 sends the Resource List 52, such as executable code modules, bitmaps, animation, sound clips, scripting systems, etc., that the Advertisement 50 needs in order to be presented. The Advertisement Feeder 250 queries the User Preference and Advertisement Database 230 and determines which resources are already available locally, i.e. on the user's PC or LAN. The Advertisement Feeder 250 creates a Polite Agent Job 285 for each resource not in the User Preference and Advertisement Database 230, requesting the Advertising System Server 600 to download only the necessary resources (steps 252, 254). Once the resources have been downloaded, the Advertisement Feeder 250 adds the Advertisement 50 to the User Preference and Advertisement Database 230 (step 253).

An important part of the functionality of the client system is the ability to resume the transfer of an Advertisement 50 which had been only partially transferred during the previous connection., i.e. the client system is preferably able to re-establish transmission of a file after a break in the Communications Link 703. Preferably, the client system will resume transmission from the point in the file at which communications was broken off. In the preferred embodiment, this functionality is implemented within the TCP/IP Polite Agent 280 and each Polite Agent Job 285.

h. Advertisement Killer

The Advertisement Killer 275 periodically scans the User Preference and Advertisements Database 230, and purges Advertisements 50 that satisfy its purge criteria. Typical criterion include the total time the advertisement has been stored and the number of times displayed. Additionally, Advertisements 50 are purged on user demand through user interaction with the Advertisements 50 or the User Interface Setup Process 201.

i. Feedback Manager

The Feedback Manager 220 is responsible for sending feedback information to the Advertising System Server 600. This information includes statistics on displayed Advertisements 50, including user ratings of specific advertisements and the time and length an advertisement was displayed. The Feedback Manager 220 also transmits information which was gathered from the user during interaction with the Advertisements 50, such as through games and questionnaires. This feedback information may be used as a basis for calculating the advertiser's charge.

j. Polite Agent Technology

Figure 6:
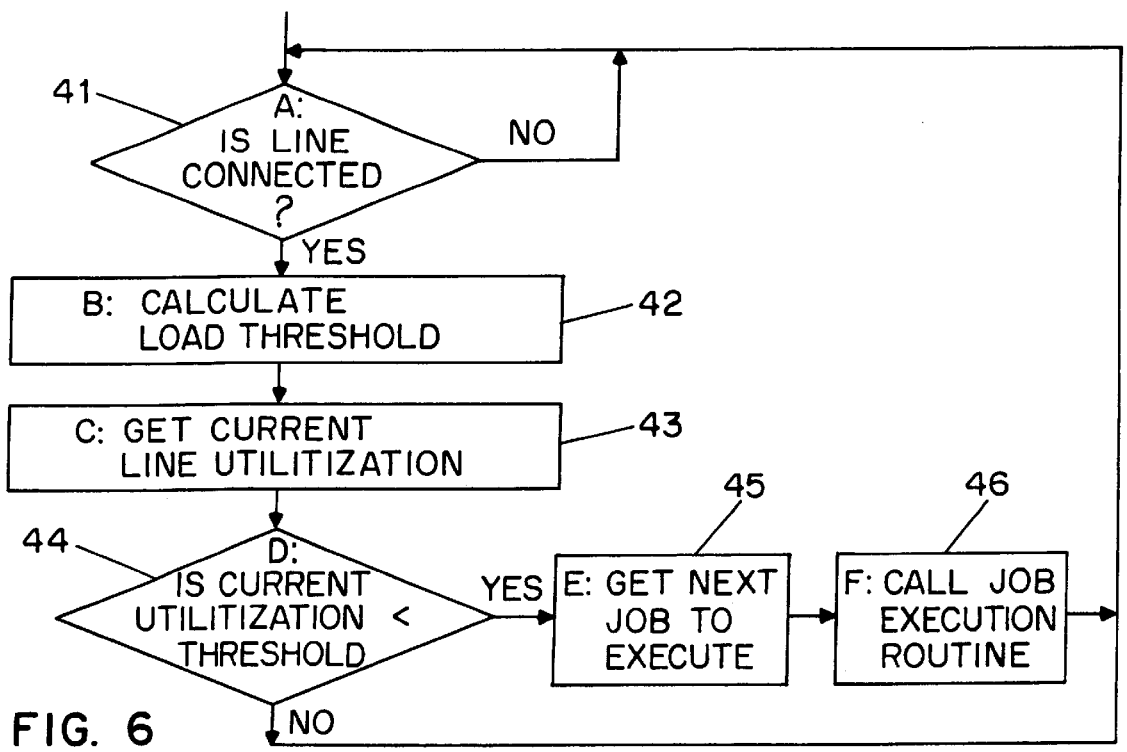
FIG. 6 is a flowchart illustrating a method for a polite agent for communicating information with a remote network in accordance with the present invention.

The system incorporates a type of intelligent software agent technology referred to herein as a "Polite Agent." The role of the Polite Agent is to perform communication tasks in the background without imposing a noticeable overhead on the user. FIG. 6 illustrates the preferred embodiment of the TCP/IP Polite Agent 280 utilizing the TCP/IP protocol. The TCP/IP Polite Agent 280 transmits information during periods of low line utilization without causing a noticeable slowdown in the data transfer rate of other processes communicating over the Communications Link 703. The TCP/IP Polite Agent 280 constantly monitors communications status and determines periods of low communication line utilization. It then uses the TCP/IP communications resources, available on the platform, to transfer a portion of the data. Preferably, the agent does not initiate the communication itself, but rather takes advantage of communications resources once the initial Communications Link 703 with the Network Service Provider 701 has been established, thus avoiding additional user charges.

If the communications resource utilization remains low and ample resources are available the software agent performs its designated data transfer task. Alternatively, if communications resource utilization becomes high due to other applications executing on the Local Computer 500 or the Communications Link 703 is disconnected (e.g., the line goes down), the TCP/IP Polite Agent 280 temporarily suspends its data transfer operation until ample resources are available once again. At that point, the TCP/IP Polite Agent 280 recovers the data transfer process from the point where the transfer was suspended, thereby avoiding the need to retransmit data.

Low line utilization occurs when the communications line is busy no more than a predetermined percentage of time. This threshold may be fixed (typically at 30%) user-configurable, or dynamic. When dynamically determined, the threshold may vary with a is number of parameters such as the length of time the TCP/IP Polite Agent 280 has been waiting to transmit, the number or type of Polite Agent Jobs 285 on the Polite Agent Queue 286, the amount of data which the TCP/IP Polite Agent wishes to transfer, and the type of data being transferred.

Neither the Advertisement Feeder 250 nor the Feedback Manager 240, directly perform data transfer. Instead, they place Polite Agent Jobs 285 in the Polite Agent Queue 286 which will be called by the TCP/IP Polite Agent 280 when appropriate. The Polite Agent Jobs 285 perform the actual data transfer.

In the preferred embodiment of the invention, the target operating system will be Microsoft Windows-95 utilizing a TCP/IP protocol. Extension of these operations for different protocols or operating systems will be apparent to those of ordinary skill in the art.

In step A (41) of the TCP/IP Polite Agent process 280, a check is made to see if the Communication Link 703 has been established. This can be done in various ways known to those skilled in the art. A preferred method is to "ping" (send a packet to and receive a response from) the Advertising System Server 600. See, e.g., J. Martin, *TCP/IP Networking*, PTR Prentice Hall Inc. (1994) (pages 147–48), the disclosure of which is hereby incorporated by reference. An alternative method is to "ping" the Network Service Provider 701.

In step B (42), the line utilization threshold is calculated. As noted above, this calculation may vary in different embodiments of the present invention. Thus, the line 10 utilization may be fixed, user-configurable or dynamic. The threshold calculation also preferably takes into account the load caused by communication generated by the Polite Agent Jobs 285 themselves. This prevents the TCP/IP Polite Agent from not transmitting when the Communications Link 703 is busy primarily due to its own communications.

In step C (43), the current communication line utilization is obtained. For TCP/IP under Windows-95, statistical information regarding the communication line utilization is available from the operating system, including such information as bytes/second. In the preferred embodiment, this sampling does not impose a significant overhead on the system and therefore does not cause any noticeable degradation of fore-ground processes.

In step D (44), the current communications line utilization is compared to the calculated threshold. If the current utilization is higher than the calculated threshold, the TCP/IP Polite Agent 280 will not perform communication and will return to step A. At this point the TCP/IP Polite Agent 280 may be temporarily suspended by the operating system.

In step E (45), the next Polite Agent Job 285 to be executed is selected. Several Polite Agent Jobs 285 can be pending on the Polite Agent Queue 286. The TCP/IP Polite Agent 280 will alternate between the Polite Agent Jobs 285 preferably on a round-robin schedule allowing all of the Polite Agent Jobs 285 to execute in turn.

In step F (46), the Polite Agent Job 285 is executed. The Polite Agent Jobs 285 are designed in such way that they generate a small amount of communication, for example sending I K of information, each time they are executed.

Figure 7:
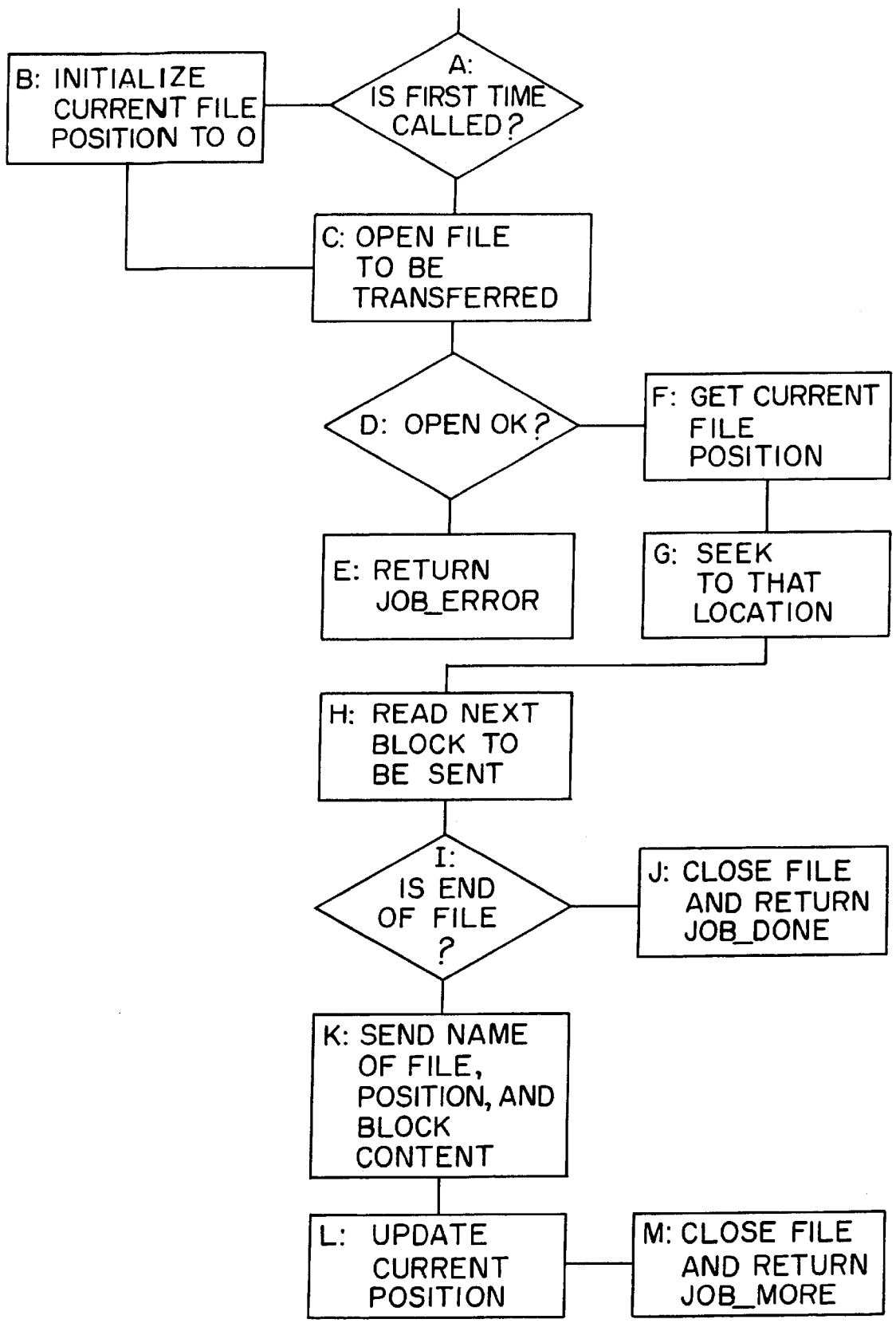
FIG. 7 is a schematic representation of a job for transmitting data in accordance with the present invention.

FIG. 7 shows a flow chart for a Polite Agent Job 285 embodying the present invention for transmitting data to the Network 700. The Polite Agent Job 285 first checks (step A) to see whether this is the first time the job has been called by the TCP/IP Polite Agent 280. If it is the first time the job has been called, the current file position is initialized 1 0 to the beginning of the file (step B). The file to be transferred is then opened (step C). If the file open is unsuccessful, the Polite Agent Job 285 returns an ERROR flag to the calling TCP/IP Polite Agent 280 which then terminates the Polite Agent Job 285, removes it from the Polite Agent Queue 286 and marks the job as terminated with error (steps D, E). If the file opens without error, the Polite Agent Job 285 seeks to the current file position in the transferring file and reads the next block of data (steps F, G, H). If no data is left to be read (end of file condition), the Polite Agent Job 285 closes the file and returns a DONE flag to the TCP/IP Polite Agent 280 which terminates the job and marks the Polite Agent Job 285 as completed successfully (steps I, J). If data was successfully read from the transferring file, the Polite Agent Job 285 transmits the name of the file, file position and file block contents to the Network 700 via the TCP/IP Protocol Stack 290 (steps I, K). The Polite Agent Job 285 then updates the current file position and stores it on persistent storage, such as the Local Computer's Mass Storage Device 516 (step L). Finally, the Polite Agent Job 285 closes the transfer file and returns a flag asking the TCP/IP Polite Agent 280 to again schedule and execute this job again.

It will be obvious to one of ordinary skill in the art how to modify the above type of Polite Agent Job 285 for other types of tasks, such as receiving files. The TCP/IP Polite Agent 280 is capable of transferring any type of information file including, executable code, digitized audio or video, and text, for a variety of types of content such as advertisements, news, or weather, etc. The information file transmitted by the Polite Agent Job 285 may consist of a true file type supported by the platform, or, alternatively, any block of data such as a database record.

In one variation of the present invention, the Polite Agent Job 285 receives as an input the current communication line utilization and a line utilization threshold value. The Polite Agent Job 285 uses this threshold to calibrate its operation by calculating how many network packets, bytes, or other units of data may be transferred without increasing the load beyond the line utilization threshold value.

One of the most common types of Polite Agent Jobs 285, is a file-transfer task. Each time the file-transfer task is run it will send (or receive) a small portion of the file, typically between 0.5-K.

Part of the information collected by the present invention may be sensitive in nature, for example, a user's responses to advertising contests may need to be authenticated to prevent fraudulent responses. The system will use known methods such as public key encryption and digital signatures in order to authenticate the information sent by the Local Computer 500. These methods are well known to those in the art.

The technology of the Polite Agent is general and may be applied in other systems and to the transmission of other types of information content such as news and weather, sports scores and stock quotes, software support information and executable updates, and airlines reservations information.

4. Locally Stored Advertisement Database

Figure 10:
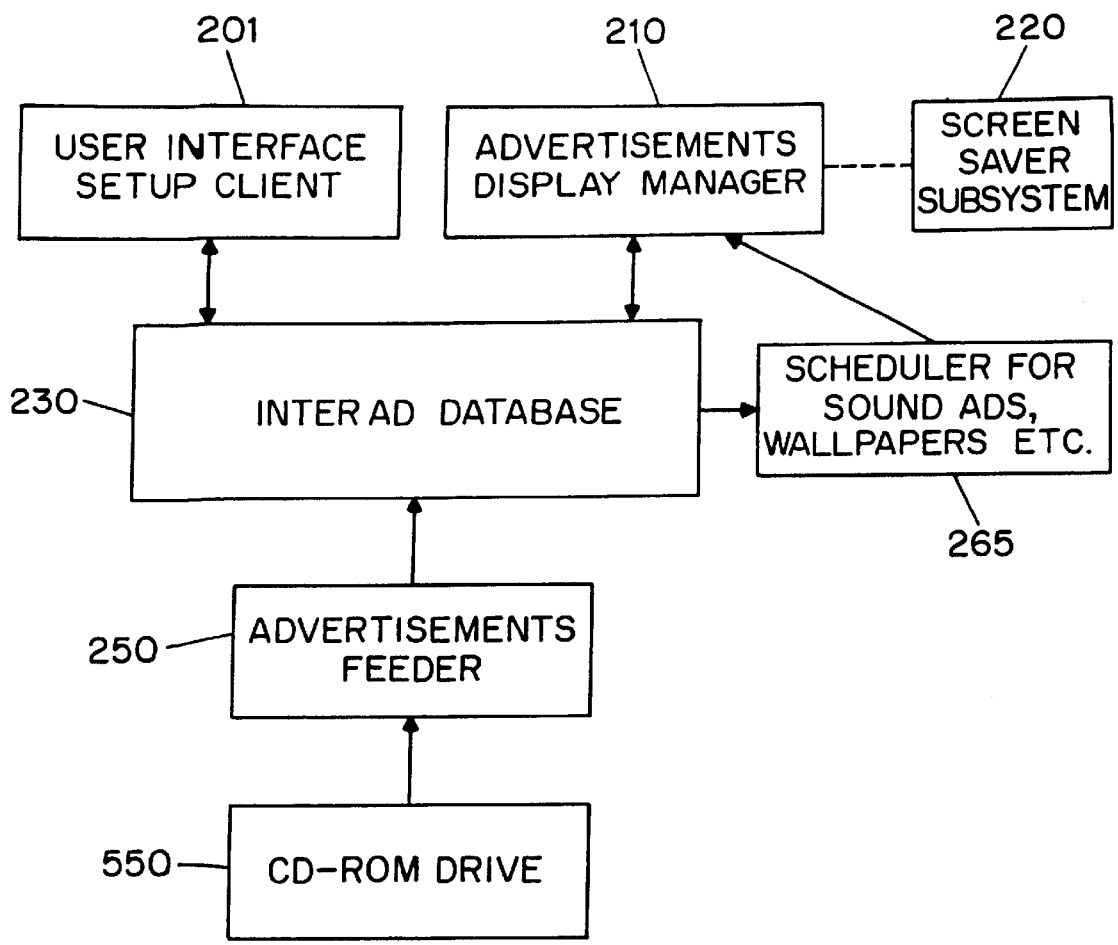
FIG. 10 is a functional block diagram of an advertising system for displaying a local database of advertisements constructed in accordance with an alternative embodiment of the present invention.

FIG. 10 shows a variation of the present invention in which a plurality of Advertisements 50 are stored locally to the Local Computer 500 in a Local Advertisement Database 550 on the Local Storage Device 540 or LAN. In this embodiment, the Advertisements 50 are not downloaded from the Advertising System Server 600, but rather are selected from the Local Advertisement Database 550. The Advertisements Feeder 250 selects Advertisements 50 for presentation on the Local Computer 500 from the Local Advertisement Database 550. In this embodiment, the Advertisements Feeder 250 includes the selection functionality described for the Network Job 725 above. Selected Advertisements 50 are loaded into the User Preference and Advertisement Database 230 for display as described above.

It is understood that various other modifications will be apparent to and can be readily made by those skilled in the art without departing from the scope and spirit of the present invention. Accordingly, it is not intended that the scope of the claims be limited to the description or illustrations set forth herein, but rather that the claims be construed as encompassing all features of patentable novelty that reside in the present invention, including all features that would be treated as equivalents by those skilled in the art.

What is claimed is:

1. A method for transmitting an information file to a local computer, the information file is stored on a server system, the local computer is coupled to the server system by a network connection, the network connection facilitating a plurality of logical communication links, the method comprising:

(i) selecting an information file for transmission to the local computer;

(ii) monitoring a current communication line utilization rate for a primary logical communications link over the network connection;

(iii) determining whether to transmit data in a current iteration based on the monitored communication line utilization rate;

(iv) if the determining of step (iii) indicated data may be transmitted, transmitting data of the information file from the server system by employing a secondary logical communications link over the network connection;

(v) tracking remaining untransmitted data of the information file, the tracking providing tracking information for any remaining untransmitted data of the information file; and (vi) repeating steps (ii) to (v) until all data of the information file has been transmitted to the local computer.

2. The method of claim 1, further comprising prioritizing information files for down-loading to the local computer.

3. The method of claim l, wherein the information file is a software update.

4. The method of claim 1, wherein the primary communication link is a TCP/IP process and the secondary communications link is a TCP/IP process.

5. A method for updating software on a local computer when updated software is stored on a server system, the local computer is coupled to the server system by a network connection, the network connection facilitating a plurality of logical communication links, the method comprising:

(i) providing an information file adapted to facilitate updating the software;

(ii) monitoring a current communication line utilization rate for a primary logical communications link;

(iii) determining whether to transmit data in a current iteration based on the monitored communication line utilization rate;

(iv) if the determining of step (iii) indicated data may be transmitted, transmitting data of the information file from the server system by employing a secondary logical communications link over the network connection;

(v) tracking remaining untransmitted data of the information file, the tracking providing tracking information for any remaining untransmitted data of the information file; and (vi) repeating steps (ii) to (v) until all data of the information file has been transmitted to the local computer.

6. The method of claim 5, further comprising identifying a version identifier for the software on the local computer.

* * * * *